US008175353B2

(12) United States Patent
Westphal et al.

(10) Patent No.: US 8,175,353 B2
(45) Date of Patent: May 8, 2012

(54) METHOD AND DEVICE FOR PRODUCING AN IMAGE OF A THIN LAYER OF AN OBJECT

(75) Inventors: Peter Westphal, Jena (DE); Daniel Bublitz, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 520 days.

(21) Appl. No.: 12/307,718

(22) PCT Filed: Jun. 27, 2007

(86) PCT No.: PCT/EP2007/005662
§ 371 (c)(1),
(2), (4) Date: Aug. 28, 2009

(87) PCT Pub. No.: WO2008/003419
PCT Pub. Date: Jan. 10, 2008

(65) Prior Publication Data
US 2010/0066823 A1 Mar. 18, 2010

(30) Foreign Application Priority Data
Jul. 6, 2006 (DE) .......................... 10 2006 031 177

(51) Int. Cl.
*G06K 9/00* (2006.01)
*G06K 9/40* (2006.01)
(52) U.S. Cl. ......... 382/128; 382/133; 382/134; 382/274
(58) Field of Classification Search .................. 382/108, 382/128, 133, 134, 274, 275, 312, 321; 250/559.16; 356/603, 604, 610, 612
See application file for complete search history.

(56) References Cited

U.S. PATENT DOCUMENTS

| 5,471,308 | A | 11/1995 | Zeien |
| 5,493,400 | A | 2/1996 | Gröbler et al. |
| 5,867,604 | A | 2/1999 | Ben-Levy et al. |
| 6,219,461 | B1 | 4/2001 | Wallack |
| 6,376,818 | B1 | 4/2002 | Wilson et al. |
| 6,731,390 | B2 | 5/2004 | Schoeppe |
| 6,819,415 | B2 | 11/2004 | Gerstner et al. |
| 7,335,866 | B2 | 2/2008 | Backs et al. |
| 7,567,726 | B2 * | 7/2009 | Westphal ...................... 382/274 |
| 2006/0098895 | A1 | 5/2006 | Westphal |

FOREIGN PATENT DOCUMENTS

| DE | 93 08 486.2 | 8/1993 |
| DE | 44 36 500 A1 | 5/1995 |
| DE | 199 30 816 A1 | 1/2001 |

(Continued)

*Primary Examiner* — Brian Le
(74) *Attorney, Agent, or Firm* — Patterson Thuente Christensen Pedersen, P.A.

(57) ABSTRACT

A method for producing an image of a layer of an object by a wide field optical element on a resolving detector. The object is illuminated in a focused manner on at least one object plane having at least two binary illuminating patterns. The corresponding images are detected. Light and/or the dark areas of the illuminating patterns completely cover the object when the illuminating pattern is superimposed. A layer image determined from the detected images, includes a partial segment that respectively reproduces a partial area of the object that is arranged inside the light area of one of the used illuminating patterns. Edges are arranged at a distance from the edges of the light area about at least one predefined minimum distance.

34 Claims, 8 Drawing Sheets

FOREIGN PATENT DOCUMENTS

| | | |
|---|---|---|
| DE | 102 50 568 A1 | 5/2004 |
| DE | 10 2004 053 730 A1 | 5/2006 |
| EP | 0 731 371 A1 | 9/1996 |
| WO | WO 98/45745 | 10/1998 |
| WO | WO 02/12945 A2 | 2/2002 |

* cited by examiner

METHOD AND DEVICE FOR PRODUCING AN IMAGE OF A THIN LAYER OF AN OBJECT

PRIORITY CLAIM

The present application is a National Phase entry of PCT Application No. PCT/EP2007/005662, filed Jun. 27, 2007, which claims priority from German Application Number 102006031177.9, filed Jul. 6, 2006, the disclosures of which are hereby incorporated by reference herein in their entirety.

FIELD OF THE INVENTION

The invention relates to a method for producing an image of a thin layer of an object, particularly by means of a wide field optical element, as well as a respective device.

BACKGROUND OF THE INVENTION

Biological samples or materials are frequently examined microscopically. Particularly, appropriate objects can be examined for detection of structures with wide field optical elements, which show the object and/or a thin layer, ideally a plane, of said object on a resolving detector. Such imaging examination can be carried out, for example, with standard microscopy or fluorescence microscopy. The thin layer, for example, can be a fluorescent layer on a slide, such as a microscopic slide or the bottom of a titer plate, which contains immobilized cells, tissue sections, or DNA fields, preferably arranged in microarrays.

However, particularly for the examination of biological objects, quantitative fluorescence microscopy is also frequently used. Generally, quantitative fluorescence microscopy, by means of irradiation of a sample, particularly a thin layer of defined thickness, aims to induce fluorescence radiation, the intensity of which depends on the concentration of fluorescing substances in the sample to be measured. Measuring the intensity of fluorescence radiation allows for conclusions regarding the concentration of the fluorescing substances. Therefore, extreme image resolution is less important that a reliable detection of the radiation emanating solely from the thin layer.

As a result, instead of high-resolution microscopes, so-called spatially resolving fluorescence readers are used, which can be viewed as optimized microscopes for quantitative fluorescence microscopy. In particular, the objects and/or samples can be biochips, manufactured either photolithographically or by means of a spotter.

In order to receive the most precise reading for the intensity of the fluorescence radiation generated in the thin layer, two conditions must be observed. On one hand, the fluorescence radiation from the thin layer should be recorded as comprehensively as possible and quantitatively precise. On the other hand, any radiation, particularly fluorescence radiation, which does not originate from the thin layer, should be suppressed as much as possible, i.e., a sufficient in-depth selection should be achieved, recording only radiation in one layer around the focal plane. The optical radiation to be suppressed shall hereinafter be called artificial light, even though it does not necessarily have to be within the visual range of the optical spectrum.

At least the following sources can be considered sources of artificial light. For example, artificial light originates from reflections and stray light on surfaces, in glasses, e.g., due to entrapped air, intrinsic fluorescence of the used glasses, on frames or in fluorescence measurements from unsuppressed excitation light. Furthermore, artificial light can also originate from areas of the object or the sample, which are outside of the focal plane located preferably within the thin layer, for example, from fluorescing contaminations on the reverse side of the object slide or from an adjacent layer with a fluorescent liquid.

However, artificial light can also compromise the mapping of the object because it decreases or alters the contrast of the detected intensity distribution.

The use of confocal laser scanners provides a possibility for avoiding artificial light. With a confocal laser scanner, always only one small area of the sample of a few $Fm^2$ is illuminated, and in addition, only this small area is viewed during detection. If executed consistently with the help of a sufficiently adjusted aperture, the artificial light will be suppressed from the start. However, compared to microscopes with wide field optical element, laser scanners exhibit a number of disadvantages. For example, excitation saturation and intense bleaching of fluorophores due to the high radiation intensity in the focal point may occur during fluorescence microscopy. Furthermore, there are significant limitations regarding the choice of wave length. Additional disadvantages are many movable components, high adjustment requirements as well as low quantum efficiency of the detector, as a rule a photomultiplier.

In order to avoid said disadvantages, methods are suggested which detect images under various illuminating patterns and calculate an image of the thin layer from the detected images.

For example, EP 972220 B1 describes a method, whereby three images of the object with the thin layer are detected, which are detected through illumination, focused on the thin layer, with spatially sinusoidal intensity profiles, which are phase-shifted by a third of a period against each other.

From the detected images, an image of the thin layer is calculated.

In DE 199 30 816 A1, a method and a device for in-depth selection of microscope images are described, whereby a one-dimensional periodic grid, e.g., a stripe grid, is used for illumination. In this case, at least n (n>2) CCD camera images are taken, whereby the structure of the illumination is shifted by 1/n each of the grid constants. Consequently, from at least three images a confocal section of the sample is calculated. This method is susceptible to artifacts when the grid does not produce sinusoidal illumination intensity on the sample.

WO 98/45745 A1 (DE 698 02 514 T2) describes an imaging system and method for microscopes, which provides structured illumination through superimposition of two coherent light beams. The method, similar to the aforementioned method, according to DE 199 30 816 A1, mainly aims to generate optical sections in various object planes analogously to a laser scanning microscope.

Both methods aim to receive a depth resolution of thick samples. Their purpose is to produce, with a wide field optical element, confocal sections of a thick sample, when compared to the depth of focus, or an object. In both cases, the calculations are relatively labor-intensive because trigonometric equations must be solved.

In the unpublished German patent application P 103 30 716.8, a device for the execution of a method for eliminating artificial light on images of heterogeneous, luminous or illuminated two-dimensional objects is described. It includes a radiation source with subsequent illuminating optical element, which homogenize the radiation, for homogenous illumination of a subsequent field stop plane, in which a structured field stop for creating an illumination structure, which is superimposed over an object or a sample, is arranged. Said illumination structure is mapped onto the sample through initial optical means, whereby said initial optical means may include an illumination tube, possibly a dichroic mirror, and a lens. Furthermore, secondary optical means for mapping the sample together with the superimposed illumination structure onto a resolving detector, particularly for optical radiation, are provided. Additionally, the arrangement contains means for adjustment, with which the illumination structure can be definably positioned in the object plane on the object or the sample. The detector is connected to an evaluation installation for determining and eliminating the artificial light. A structured bright field illumination with at least two different illumination patterns is used, whereby dark areas do not overlap. Subsequently, a dark frame and a light frame can be determined from respective images. Subtraction of the dark frame from the light frame leads to the resulting image.

The structured bright field illumination provided for this device, in which the object illumination and the mapping of the object together with the superimposed field stop structure are achieved with a single lens, the excitation light in the lens can cause the occurrence of artificial light, particularly through intrinsic fluorescence of the applied glasses.

Furthermore, the reverse side of an object, e.g., a biochip, is exposed to almost the same excitation intensity as the focal plane. Therefore, the fluorescence intensity, caused by contamination of the reverse side, can be correspondingly high and lead to errors in measurements. In order to avoid said disadvantages, it was, therefore, suggested to use a structured dark field illumination instead of the bright field illumination.

Both methods require execution of an interpolation between the non-illuminated areas in order to obtain a complete dark frame and/or artificial light image.

However, for the quantitative fluorescence microscopy, all aforementioned methods have the disadvantage that the precision of the concentration measurements of fluorescent material in the thin layer is still improvable, even though an in-depth selection is achievable and artificial light from the areas adjacent to the thin layer can be at least partially suppressed.

SUMMARY OF THE INVENTION

The invention hereto is, therefore, based on the task of establishing a method for creating an image of an, also particularly thin, layer of an object, which at the same time also allows for sufficient in-depth selection and high quantitative precision of fluorescence measurements as well as a device for executing the method.

The task is solved with a method for producing an image of a layer of an object by means of a wide field optical element on a resolving detector, whereby the object is illuminated in a focused manner on at least one object plane with at least two binary illuminating patterns and for each illuminating pattern, the corresponding images are detected, whereby the illuminating patterns respectively comprise dark areas and light areas, and the light and/or the dark areas are completely covering the object when the illuminating patterns is superimposed, and a layer image is determined from the detected images, said layer image comprising partial segments that respectively reproduce a partial area of the object that is arranged inside the light area of one of the applied illuminating patterns such that said edges are arranged at a distance from the edges of the light area about at least one predefined minimum distance, and which are respectively determined with at least partial artificial light correction using at least two images, which are respectively detected for different illumination patterns in which the partial area corresponding to the respective partial segment is arranged completely inside the light area of a first different illuminating pattern or completely inside a dark area of a second of the different illuminating patterns.

Furthermore, the task is solved with a device for producing an image of a layer of an object with an illumination installation for focused illumination of the object in an object plane, a device for producing at least two predefined illuminating patterns for illuminating the object in the object plane with an element, which serves as structured aperture, arranged behind the illumination installation within the optical path, whereby the illuminating patterns respectively comprise dark areas and light areas, and the light areas and/or the dark areas are completely covering the object when the illuminating patterns are superimposed; an imaging optical element, preferably in the form of a wide field optical element, for mapping of the object plane onto an image plane; a resolving detector, arranged on the image plane, for detecting optical radiation from the object; and an evaluation installation for processing detection signals from the detector, which is constructed such that it can detect images on the basis of detection signals and execute the steps, in accordance with the invention, which follow the image detection, and, particularly, to determine a layer image from the detected images, which comprises partial segments that, respectively, reproduce a partial area of the object (4) that is arranged inside the light area of at least one of the applied illuminating patterns such that said edges are arranged at a distance from the edges of the light area about at least one predefined minimum distance, and which are respectively determined with at least partial artificial light correction using at least two images which are respectively detected for different illumination patterns in which the partial area corresponding to the respective partial segment is arranged completely inside the light area of a first of the different illuminating patterns or completely inside a dark area of a second of the different illuminating patterns.

The method, which can be executed with the device, produces an image of a layer of an object, preferably a two-dimensional object, particularly a heterogeneous, luminous or illuminated object.

Particularly, this method can be a microscopy method, preferably a quantitative fluorescence microscopy method, or a method with the use of a fluorescence reader.

The method does not necessarily require a thin layer; particularly, the layer can be an entire layer and not only a single plane, in which the illumination radiation is focused.

In the method, the layer of the object, which is, within the scope of the invention and depending on the size of the mappable area within the object plane, perceived as an entire sample or an entire object or only the partial area of an entire sample or an entire object to be examined or mapped, illuminated with at least two structured binary illuminating patterns. Compared to illuminating patterns with an intensity profile in the form of a sine profile, a binary illuminating pattern hereto is an illuminating pattern with which the structuring essential for the method is achieved in that essentially no illumination radiation reaches the dark areas, at least within the scope of the geometric optics, and the transition between dark and light areas, compared to the extent of said areas, is very small (IF POSSIBLE PLEASE INDICATE QUANTITATIVE LIMIT). The light and/or dark areas of the object are those areas of the object, which are arranged within the light and/or dark areas of the illuminating pattern when illuminated with a respective illuminating pattern.

In order to produce structured illumination, the device contains the illumination installation for dispensing illumination light, which, within the scope of the invention hereto, includes visible as well as infrared or ultraviolet radiation, and the installation for producing at least two predetermined illuminating patterns for focused, also particularly structured, illumination of the object at least in the object layer to be mapped. Thereto, the installation for producing the binary illuminating patterns contains, particularly, an element acting as aperture, which preferably acts as field stop. The element contains translucent and/or transparent and lightproof and/or opaque areas, which correspond with respective light and dark areas in the illuminating patterns, which are adjacently located. Therefore, with illumination light, illuminated and unlit areas appear in and/or on the object or the examined area.

The method requires that the object is illuminated successively with a different illuminating pattern. The illuminating patterns used in this method are chosen in such a way that their dark areas and/or their light areas completely cover the object with an imagined or fictitious simultaneous superimposition of the illuminating patterns.

The object illuminated with the respective illuminating pattern is subsequently mapped by means of the imaging optical element, which may particularly include a lens, onto the resolving detector, which is used to detect images of the object. Preferably, a CCD or CMOS matrix can be used as resolving detector.

The signals of the resolving detector are processed into images by the evaluation installation, for example, a data processing installation with a video interface, a memory unit, in which at least one computer program is stored for executing the evaluation and, particularly, the processing steps after illumination of the object, and a processor for executing the computer program.

Among others, the inventions is based on the following observation: Focusing of structured illumination radiation, such as illumination radiation with a sinusoidal intensity profile diagonal to the direction of the beam, in a plane of the object results along the direction of the beam in a distribution of the illumination intensity determined by the properties of the optical element used for focusing; said illumination intensity can reach its maximum in the plane but decreases from the maximum point parallel to the direction of the beam. Mapping of the plane on the detector by means of an imaging optical element, an analogous phenomenon occurs, so that a depth response function, defined for the respective illuminating pattern, and which indicates the intensity received by the detector as function of the distance of the source from the plane of the direction of the beam, also exhibits a maximum in the plane; in the area of the maximum, the depth response function is also curved, and the received intensity for a given illumination intensity decreases with increasing distance from the focal plane. Said decrease leads to a reduced sensitivity near the focal plane, and the radiation from the illuminated layer is not completely detected.

Furthermore, with random illuminating patterns in every detected image of the illuminated areas of the object, which are illuminated with light areas from the respective illuminating pattern, if present, the respective shares of light from the artificial light are directed to the areas of the image of the object, which correspond with the dark areas of the respective illuminating pattern on or in the object, i.e., the unlit areas of the object. In said areas, the shares are detected as artificial light.

In order to increase the sensitivity in the layer and reduce the influences of artificial light, it is suggested, according to the invention, to use binary illuminating patterns as well as combine such areas in the detected images for correction of artificial light, which are within the light and dark areas of the illuminating patterns used for detecting images, and the edges of which exhibit a predetermined minimum distance from the transitions between the light and dark areas. This greatly reduces the influences of the transitions between light and dark areas and results, surprisingly, in a depth response function with a plateau near the maximum, providing for essentially constant sensitivity along the width of the plateau.

Furthermore, the method, according to the invention, excels in its simplicity because only simple sum operations and selections of intensity values are necessary. These steps are accomplished substantially quicker with computers, but also simpler processors, or even unprogrammed circuits, than with trigonometric operations.

Correspondingly, the device, according to the invention, can also be constructed in a very simple fashion.

In principle, with this method, small areas between the partial segments may occur, in which the brightness values can be determined through interpolation between the values of the adjacent partial segments. However, with this method it is preferred for the partial segments to either join without a gap or overlap. Thereto, the device is preferably designed in such a way that the partial segments either join without a gap or overlap. This does not require interpolation between the partial segments, which significantly accelerates the execution of the method and increases the precision of the resulting layer image. Particularly, since the dark areas of the illuminating patterns completely overlap the object in case of superimposition of the illuminating patterns, a dark frame or an artificial light image of the entire object, which contains all the artificial light segments to be eliminated, can be obtained without interpolation from the dark areas of the images. In case of overlapping partial segments or respective partial areas of the object, it is possible to ascertain mean values through the redundant partial areas of the different images. For example, through summation of the images of the light areas, a renormalization in the overlapping areas can be executed in order to correct the effects of double detection in those areas. If the partial segments of the illuminating patterns overlap, it is possible to ascertain mean values from different images preferably through the redundant partial areas of the images of the dark areas.

For the method it is particularly preferred that the partial segments overlap less than 10% of the minimum extent. Thereto, the device is preferably designed in such a way that the partial segments overlap less than 10% of the minimum extent. This allows for the use of only a small number of illuminating patterns.

Basically, the minimum distances can be chosen arbitrarily. However, with the method, minimum distances greater than $\frac{1}{5}$ of the smallest distance of adjacent borders of a light or dark area are preferred. Therefore, the device is preferably designed in such a way that the minimum distances are greater than $\frac{1}{5}$ of the smallest distance of adjacent borders of a light or dark area. This further development has the advantage that the intensity of radiation emerging from a layer around a focal plane can be detected particularly comprehensively.

The partial segments can be formed through various means. One version of the method allows for the initial formation of a light or dark frame from the detected images for the determination of the layer image, whereby partial segments of the detected images, which reproduce respective areas of the object, are used, and which reproduce an area of the object within the light or dark area of an illuminating pattern used for detection of a respective image, and the edges of which display the minimum distance from the transitions between the light and dark areas of the illuminating pattern. By calculating the difference between the light and dark frames, at least a partially corrected layer image can be produced.

In the device, the evaluation installation is preferably designed in such a way that it initially forms a light and dark frame from the detected images for determining the layer image, whereby partial segments of the detected images, which reproduce areas of the object, are used, and which reproduce an area of the object within the light or dark area of an illuminating pattern used for detection of a respective image, and the edges of which display the minimum distance from the transitions between the light and dark areas of the illuminating pattern, and which produce at least a partially corrected layer image by calculating the difference between the light and the dark frame. This advantageous version allows for a simple smoothing of the light and/or dark frames.

For a different version of the method, an even number of illuminating patterns can be used. At first, images with at least partial artificial light correction can be determined through formation of a difference image from detected images, whereby the respectively used illuminating patterns of said images are complementary to each other, and from the images with partial artificial light correction a layer image can be determined. Therefore, the device is preferably designed in such a way that an even number of illuminating patterns is used, and the evaluation installation is designed to, at first, determine images with at least partial artificial light correction through formation of a difference image from detected images, whereby the respectively used illuminating patterns of said images are complementary to each other, and to determine a layer image from the images with partial artificial light correction. This version has the advantage of an easier assembling of partial segments. Assembling in this context also means that the segments can partially overlap.

Assembling of the partial segments can also be understood as image montage. For assembling, the partial segments are arranged relative to one another according to the arrangement of the respective areas on the object. For example, assembling can be achieved through addition of the images.

The illuminating patterns themselves can exhibit different structures if the dark and light areas and the partial segments also exhibit the aforementioned properties. For example, illuminating patterns with radially arranged light and dark areas can be used, which can be produced respectively through rotation of an appropriate basic pattern around the center and at a predefined angle.

However, for the method according to the invention, the illuminating patterns are preferably determined by a basic pattern, which is offset differently each time and relative to the object. Thereto, the device is preferably designed in such a way that the illuminating patterns are preferably determined by a basic pattern, which is offset differently each time and relative to the object. Therefore, the illuminating patterns exhibit the same structure but are offset against each other in the object plane. Such illuminating patterns are easily produced. Furthermore, the processing of the images produced with the illuminating patterns is particularly simple.

For the method, it is particularly preferred to use a periodic basic pattern as basic pattern, whereby the offset basic patterns are obtainable through a shift of the basic pattern relative to the object.

Thereto, the device is preferably designed in such a way that the basic pattern is a periodic basic pattern, whereby the offset basic patterns are obtainable through a shift of the basic pattern. Particularly, the respective shift can depend on the period of the basic pattern. This type of illuminating pattern not only allows for particularly simple producing but also a simple processing of the images.

Thereby, it is particularly preferred to choose the amount of shift or shifts and the number of shifts and, therefore, the illuminating patterns, in such a way that a depth response function displays a plateau in the area of the focal plane in which the illuminating patterns are focused. For that purpose, the device can be designed particularly preferable in such a way that the amount of shift or shifts and the number of shifts and, therefore, the illuminating patterns, are chosen in such a way that a depth response function displays a plateau in the area of the focal plane in which the illuminating patterns are focused. Depth response function in this context means the already aforementioned function. Plateau in this context means that this function assumes a constant value not only in the point-shaped area of the focal plane. Preferably, it decreases via steep slopes to a value close to zero or, preferably, to a value of zero.

The shift of the illuminating patterns relative to the object can be achieved in different ways.

In a preferred embodiment of the method according to the invention, the object is shifted relative to the illuminating pattern.

Thereto, in the device according to the invention, a drive, with which the object or an object slide can be moved, is controllable from the evaluation installation in such a way that on the object, shifted through movement, a basic pattern forms an illuminating pattern, whereby the basic pattern is produced by an element acting as structured aperture, and images are automatically detectable after every shift of the object by means of the evaluation installation. Preferred drives to be used are piezoactors or eccentric drives, which allow for very precise positioning. If necessary, the drive can also be used for the already necessary positioning of the object relative to the optical element. Preferably, an already existing power-operated microscope stage can be used. Thereby, the movement caused by the drive is possible in one or two directions along the object plane, depending on the illuminating patterns. The evaluation installation can be particularly designed to produce a series of illuminating patterns on or in the object through activation of the drive, whereby an image is detected after adjustment of one illuminating pattern each. Therefore, the operation for the user of the device is substantially simplified. Furthermore, through appropriate programming of the evaluation installation, the necessary dependency between the type of illuminating pattern and the necessary shifts can be taken into account automatically.

In order to avoid movement of the object relative to the detector, the basic pattern for the previously described version can alternatively and preferably be shifted by means of a mechanical device. In the device according to the invention, the element acting as structured aperture is preferably a field stop.

A drive, through which the field stop or a part of the field stop is movable, is controllable with the evaluation installation in such a way that the illuminating patterns are beamed onto the object. After every change of the illuminating pattern, images are automatically detected by means of the evaluation installation. The field stop, particularly in this context, is an aperture, which contains rigid, nontransparent and/or opaque elements for the formation of the structured illumination.

Alternatively, for the movement of the illuminating patterns it is possible that the element acting as structured aperture is a field stop, and a movable light bending element for producing the, at least, two illumination structures is arranged behind the field stop. Thereby, the field stop can be firmly positioned. Particularly, as light bending element, a reflecting surface or a transparent plane-parallel plate, which, depending on the applied illuminating patterns, can be tilted around one axis or two orthogonal axes, can be used. Preferred drives can be piezoelectric drives or eccentric drives. In order to simplify the adjustment of the illuminating patterns and the detection of the respective images, a drive, which moves the light bending element, is controllable with the evaluation installation in such a way that the illuminating patterns are beamed onto the object. After every change of the illuminating pattern by means of the evaluation installation, images are automatically detected. This further development has the advantage previously mentioned in connection with the automatic activation.

In both embodiments, the field stop exhibits transparent and opaque areas, which are designed in such a way that the desired illuminating patterns are obtained in the object plane.

If the use of mechanical means for shifting of the basic pattern is to be avoided, an electrically controllable modulation device for light can be used, which is controlled in such a way that the illuminating patterns are produced. For example, in the device according to the invention, the element acting as aperture can be designed as such an electronically controllable modulation device. As electrically controllable modulation devices for light, for example, so-called DMD's (digital mirror devices) or electronically controlled transmitted light or reflection liquid crystal displays or LCD's can be used. As previously stated, the evaluation installation is preferably controllable in such a way that the illuminating patterns are beamed onto the area to be examined, and images are automatically detectable after every change of the illuminating pattern by means of the evaluation installation. This embodiment of the invention not only dispenses with mechanical drives but also allows for a uncomplicated switch between different types of illuminating patterns.

In a preferred version of the method, a periodic striped pattern with period p can be used as basic pattern, whereby the periodically alternating light and dark stripes are of equal width and from which the other illuminating patterns are obtainable through a shift by m¡n times the period p transversely to the longitudinal direction of the stripes, whereby n equals the number of illuminating patterns and 0<m<n. The field stop for the device thereto preferably exhibits a stripe-shaped structure of alternating transparent and opaque areas of equal width.

Thereby, the stripes preferably extend over the entire area and/or object to be examined. The more illuminating patterns are used, the less excitation light is used for the detection of a respective image. This way, the intensity noise in the background of the resulting image can be lowered almost arbitrarily. Thereby, the dimensions of the transparent and opaque areas are selected in such a way that the illuminating patterns can be produced with the aforementioned parameters. With the use of an electrically controlled modulation device, appropriate construction and/or programming of the evaluation installation suffices for producing said illuminating patterns.

Alternatively, illuminating patterns with one periodic arrangement each of light and dark areas in two directions can be used, whereby the arrangements are offset against each other in at least one of the directions. If a mechanically movable field stop is used, the field stop preferably exhibits a periodic arrangement of transparent and opaque areas in two directions, whereby the opaque areas are adjacent to each other. With the use of an electrically controlled modulation device, appropriate construction and/or programming of the evaluation installation suffices for producing said illuminating patterns. The directions can be orthogonal to each other, however, it does not necessarily have to be the case. In this embodiment, the representation of a direction through the use of stripes is avoided, therefore, suppressing artificial light is less dependent on direction. Furthermore, due to the structured illumination, the modulation disappears faster outside of the focal plane or object plane, therefore better suppressing light outside of the depth of field of the imaging optical element.

If periodical illuminating patterns are used, it is possible that due to the periodicity of the illuminating patterns, illumination inhomogeneities are present in the image freed from artificial light. Therefore, for the method according to the invention, it is preferred to filter the artificial light corrected images with low frequency before the layer image is produced. In the device thereto, the evaluation installation is preferably designed in such a way that the artificial light corrected images are filtered with low frequency before the layer image is produced.

If an object is to be examined with dark field illumination, which can be particularly desirable in the case of quantitative fluorescence microscopy, the illuminating optical element for mapping of the element, which acts as aperture, onto the object is designed for dark field illumination.

Therefore, the illuminating optical element of the device, according to the invention, should be designed as illumination lens with small aperture, whereby the optical axis of the illumination lens and the optical axis defined by the imaging optical element should form the angle α. This design provides for a large depth of field area. Preferably, the angle α should be greater than 50° in order to minimize the radiation intensity on the bottom of transparent objects or samples.

In this case, the illuminating optical element is preferably a Scheimpflug optical element. Thereby, a larger numerical aperture can be provided for the dark field illumination because the focal plane can be adjusted to the illumination on the top side of the sample.

Furthermore, the imaging optical element for mapping the object onto the detector can include a Scheimpflug optical element. In this case, the optical axis of the illumination lens is positioned vertical to the surface of the sample, while the optical axis of the imaging lens is positioned at an angle α to the optical axis of the illumination lens.

The method as well as the device, with which this method can be executed, can, advantageously, be used for reading biochips, as well as in quantitative fluorescence microscopy, and for photometric measurements.

BRIEF DESCRIPTION OF THE DRAWINGS

In the following, the invention shall be further explained in examples with the help of drawings. They show.

DETAILED DESCRIPTION

Figure 1:
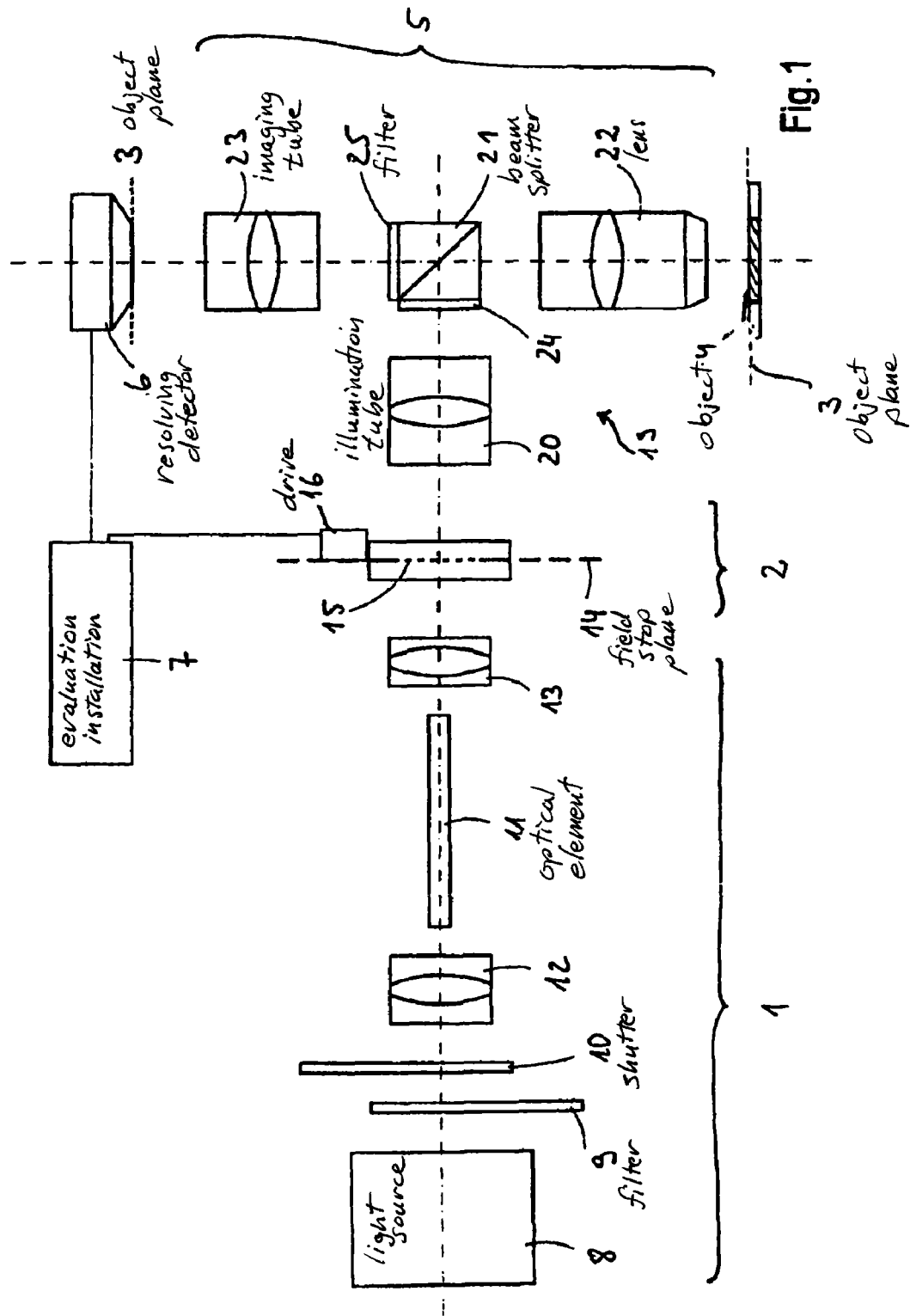
FIG. 1 a schematic representation of the optical structure of a device for the detection of an image of an object, according to the first preferred embodiment of the invention.

A device, shown greatly simplified and schematically in FIG. 1, for producing an image of a layer of an object, according to a first embodiment of the invention, includes an illumination installation 1, an subsequent installation 2 for producing illuminating patterns in an object plane 3 of an object 4, arranged on a slide or stage, an imaging optical element 5 for mapping object 4 on an image plane B, as well as a resolving detector 6, arranged in the image plane. An evaluation installation 7 is connected to the detector 6 by means of a detector connection, and with installation 2 by means of a control line.

Illumination installation 1 contains a light or radiation source 8 with a subsequently arranged filter 9, a shutter 10 and, optionally, optical elements 11, which homogenize the optical path, and which, for example, can be a light transmission bar or a hollow rod with internal reflection; and furthermore, first illuminating optical elements 12 and 13 for homogenous illumination of an area of a field stop plane 14.

Installation 2 contains an element, acting as structured aperture, which is arranged in the optical path of the illumination installation 1, through which it is homogeneously illuminated, and which is definably movable in the optical path in two orthogonal directions to each other along the field stop plane 14; for example, a structured field stop 15, as shown, and a drive 16, only schematically represented in FIG. 1, with which the field stop 15 can be moved.

Figure 2:
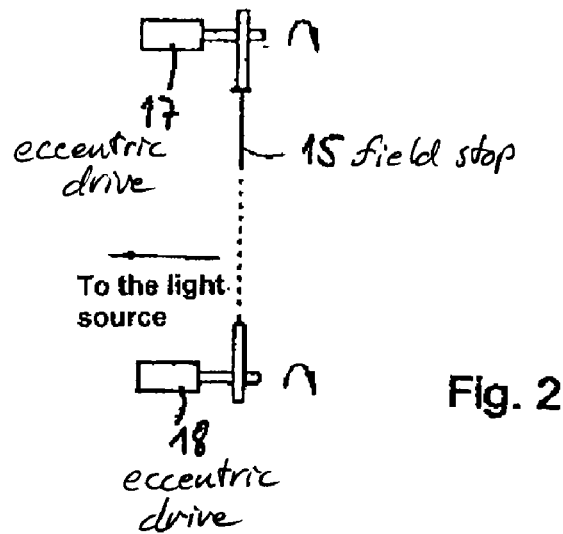
FIG. 2 a schematic partial representation of an installation for producing illuminating patterns with a field stop with eccentric drive in the device in FIG. 1.

The mechanical construction of the installation 2 for producing illuminating patterns is shown more precisely in FIG. 2. Eccentric drives 17 and 18 are coupled with the field stop 15 in such a way that in can be moved laterally in two directions orthogonal to each other along the field stop plane 14, and therefore, definably positioned.

The field stop 15 exhibits periodically arranged, stripe-shaped opaque areas, which are separated by transparent areas; as a result, respective stripe-shaped illuminating patterns can be produced, as will be further explained below.

Additionally, FIG. 1 shows, arranged subsequently to element 15, a second illuminating optical element 19, which contains an illumination tube 20, a beam splitter 21 and a lens 22, and through which the field stop 15 is mapped onto the object 4 or object plane 3 to be examined or mapped, thereby beaming onto the object 4 an illuminating pattern in accordance with the position of the field stop 15 in field stop plane 14 and its structure.

The imaging optical element 5, which represents a wide field optical element, includes in said example the lens 22, the beam splitter 21 as well as an imaging tube 23, and maps the object 4, illuminated with the respective illumination structure, with high contrast onto the image plane B or the resolving detector 6 for optical radiation.

In the example, the beam splitter 21 is designed as color separation beam splitter and contains filters 24 and 25, with which unwanted or interfering spectral radiation components can be filtered out.

The beam splitter 21 and the filters 24 and 25 are components of a device for incidental light fluorescence, whereby it is advantageous to position the filters 25 and 26 angularly by a few angular degrees in order to remove interfering reflexes from the optical path.

The detector 6 includes a matrix of CCD and CMOS elements, and, in the example, is part of a CCD camera.

The detector 6 is connected to the evaluation installation 7, which collects signals from detector 6, executes the detection and/or elimination of the artificial light during imaging of object 4, and produces a resulting layer image. Thereto, the evaluation installation 7 contains a processor, a memory unit, and appropriate interfaces. The resulting images can be stored and/or transmitted to a display device, not shown in FIG. 1, or a printer.

Furthermore, the evaluation installation 7 serves as control unit for the drive 16, with which the illumination structure, produced by the structured field stop 15, is movable. The evaluation installation 7 is designed in such a way that it produces a series of illuminating patterns through activation of drive 16 and shutter 10 and detects, by means of detecting the signals from the detector 6, a series of images of the examined area or object 4, which correspond with the respective illuminating patterns. Said images are processed in the evaluation installation after the last image of the series is detected.

Figure 3:
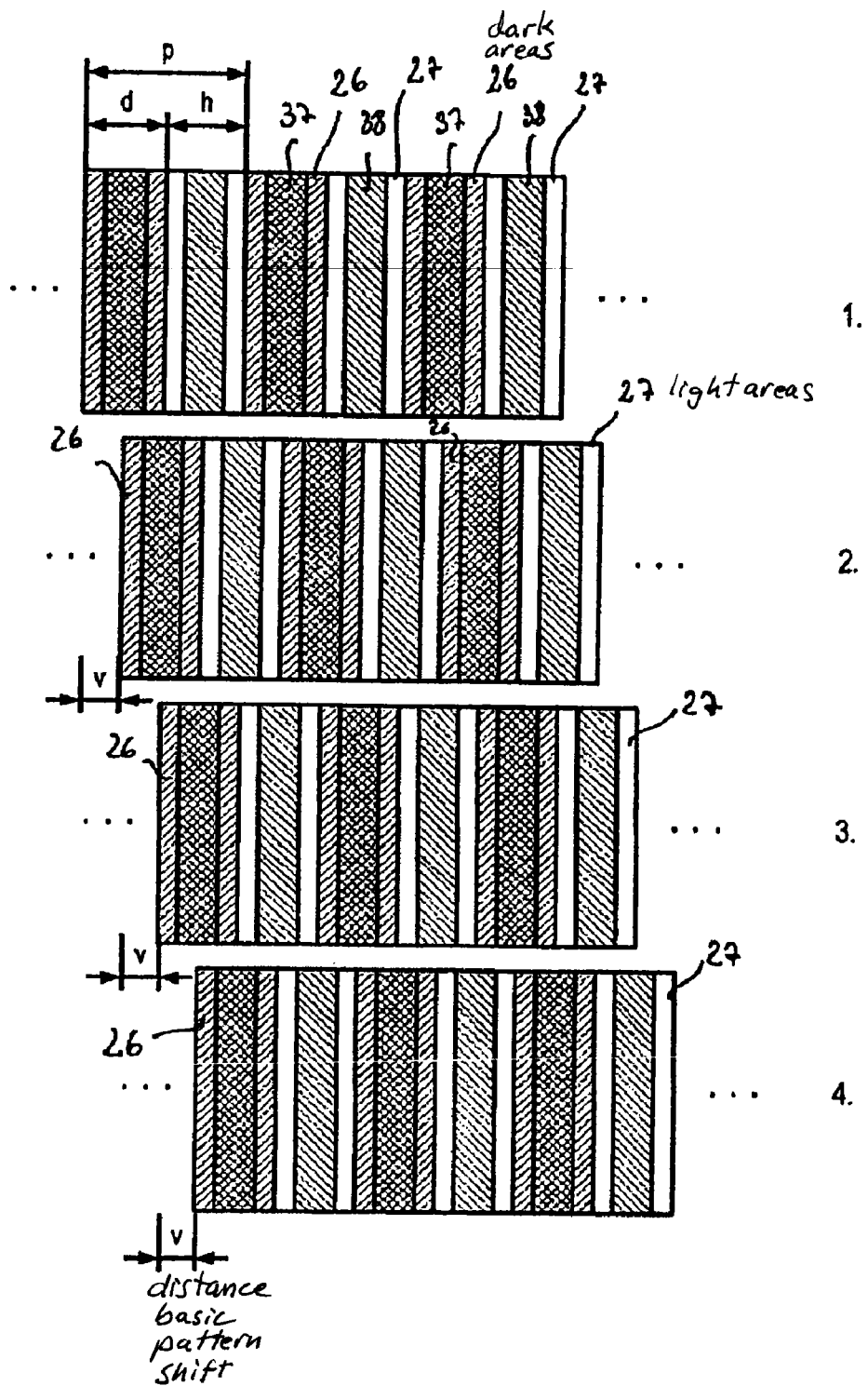
FIG. 3 four illuminating patterns obtainable with the field stop of the device in FIG. 1.

During the execution of a method according to a first preferred embodiment of the invention, four illuminating patterns, shown in further detail in FIG. 3, are used, which correspond with the structure of the field stop 15.

The first illuminating pattern is a basic pattern. The other illuminating patterns result from the basic pattern through shifting the basic pattern by distance v. The basic pattern possesses a periodic structure of the period p with stripe-shaped dark areas 26 with the width d and stripe-shaped light areas 27, which exhibit the same width h as the dark areas 26, and which are arranged alternatingly between the dark areas 26.

The basic pattern is shifted three times by the distance v in a direction, which is aligned orthogonally to the longitudinal direction of the stripe-shaped dark areas 26 or light areas 27. In this example, the distance v, around which the sequential illuminating patterns, which originated from the shifts of the basic pattern, and which are offset against each other, equals the length of a quarter of the period p. If N illuminating patterns are used instead of the four illuminating patterns in this example, v can be chosen particularly to p/N.

The period p on the sample side lies preferably between 1 μm and 100 μm.

When the four illuminating patterns overlap in the object plane 3, the area to be examined or the object 4 are completely covered by the dark areas 26. Therefore, if the dark areas 26 are merged, the object 4 is completely covered by said dark areas 26, making interpolation between the dark areas 26 unnecessary.

The same applies to the light areas 27.

In a method for producing an image of a layer of the object 4 by means of a wide field optical element or the imaging optical element 5 on the resolving detector 6, according to a first preferred embodiment of the invention, the object 4 is illuminated in the object plane 3 successively with the four illuminating patterns, which are focused on the object plane 3, whereby the evaluation installation 7 controls the drive 16 and the shutter 10 accordingly. For each of the illuminating patterns, a respective image is automatically detected by means of the detector 6 and the evaluation installation 7. If applicable, in the areas, onto which the dark areas 26 are mapped, the detected images exhibit amplification through artificial light, which is given off by segments of the object 4, which are illuminated with light areas 27.

From the detected images, a layer image of the object 4 is subsequently produced in the evaluation installation 7.

At first, a light and dark frame are produced. For producing the light and/or dark frame, only those partial segments are use, which correspond with the partial areas 37 and/or 38 of the light and/or dark areas 27 and 26, which, respectively, form stripes located in the center of the light and dark areas. In this embodiment, said partial segments correspond with about the mean 50% of the images of the light and dark areas.

Subsequently, the light and dark frames are formed through merging those partial segments which correspond with the partial areas 37 and 38.

The arrangement of the areas of the detected images to each other and/or the partial segments corresponds thereby with the arrangement of the light and dark areas of the illuminating patterns on the object 4, which correspond with the detected images.

Subsequently, the dark frame is computationally smoothed for noise suppression by the evaluation installation 7 with the use of an appropriate low-pass filter.

Finally, the dark frame is subtracted from the light frame in the evaluation installation 7, whereby a resulting layer image of the object 4 is developed, in which artificial light is suppressed, but the intensity within the layer is detected with great precision.

With this method it is possible that a total depth response function, which specifies, for points on the optical axis, the detected intensity of optical radiation, which, in turn, emanates from a location on the optical axis at a distance z from the object plane, as function of the radiated intensity, appears in such a form that a confocal suppression is achieved for planes far away from the object plane, thereby detecting fluorescence radiation, which originates at a certain depth of focus around the focal plane, with full efficiency. Therefore, the total depth response function at the center of a plateau exhibits the value 1 or almost 1.

The total depth response function for different structured illuminations can be calculated or estimated as follows. In the event that the structures, which are mapped onto the object, are distinctly coarser than the resolution limit of the optical system, i.e., the imaging optical element 5, those calculations can be approximated with the models of geometric optics.

Generally, the models of geometric optics can be applied, when the transfer function of the optical system, also called PSF (point spread function), can be approximated in the focus by means of a delta function. For a first step, it shall be assumed that said condition has been fulfilled. Furthermore, it shall be assumed that the field of the light wave in the pupil plane corresponds with a homogeneously illuminated circle.

The numeric aperture of the imaging optical element 5 can be calculated from the ratio between the diameter of the illuminated field in the pupil and the focal length of the imaging optical element 5. The PSF as function of the distance to the focal plane, therefore, results in a circle, the radius $R_{PSF}$ of which depends on the distance to the focal plane z, the focal length f of the imaging optical element 5 as well as the pupil radius $R_{Pupil}$ as follows:

$$R_{PSF} = z \cdot \frac{Rpupil}{f}$$

The intensity distribution, which develops in a plane at distance z from the object plane, results, therefore, as folding of the illumination structure $I_{StructuredIllumination}$ with the defocused PSF:

$$I_{Sample}(z) = \bigcirc PSF(z) \times I_{StructuredIllumination}.$$

The Detector 6 for the fluorescent light is situated on a plane conjugate to the focal and object plane. Therefore, intensity $I_{detector}$ in the detector plane is calculated as follows:

$$I_{detector} = \bigcirc PSF(z) \times (\bigcirc PSF(z) \times I_{StructuredIllumination}).$$

Insofar, PSF(z) can be perceived as depth response function. Since the imaging optical element 5 is simultaneously used as illumination in this example, the total depth response function is a result of the double application of PSF(z).

With the intensity distribution thus determined on the detector as function of defocussing z, the total depth response function can now be determined.

In the method described in prior art, a sinusoidal intensity distribution is projected onto the surface, and the modulation on the detector is measured. Therefore, $$I_{StructuredIllumination} = 1 + \sin(\omega_x x)$$

is valid, whereby $\omega_x$ signifies the spatial frequency in a plane orthogonally to the direction of the optical axis of the imaging optical element 5 and/or the direction of the beam or the z axis and x a point in the plane.

This intensity distribution is folded twice with a circle with a radius depending on depth z. Therefore, the Fourier transform of the PSF(z) corresponds with a modified Bessel function. Said function squared is known as Airy function. The illumination function results in 3 peaks at zero, $+\omega_x$ and $-\omega_x$. If this function is multiplied with the Airy function, only those three points of zero result in different values.

By means of the method of structured illumination, only the modulation of the intensity distribution is measured. Therefore, through the two peaks at $+\omega_x$ and $-\omega_x$, only two values are cut from the Airy function. Varying depth z results in Airy functions with different scales, from which the Fourier transform of the illumination function only cuts the values $+\omega_x$ and $-\omega_x$, respectively. In summary, it can, therefore, be said that in the model of geometric optics, the total depth response function with an illumination with sinusoidal intensity distribution and the computing algorithms, as described above, corresponds with an Airy function.

Figure 4:
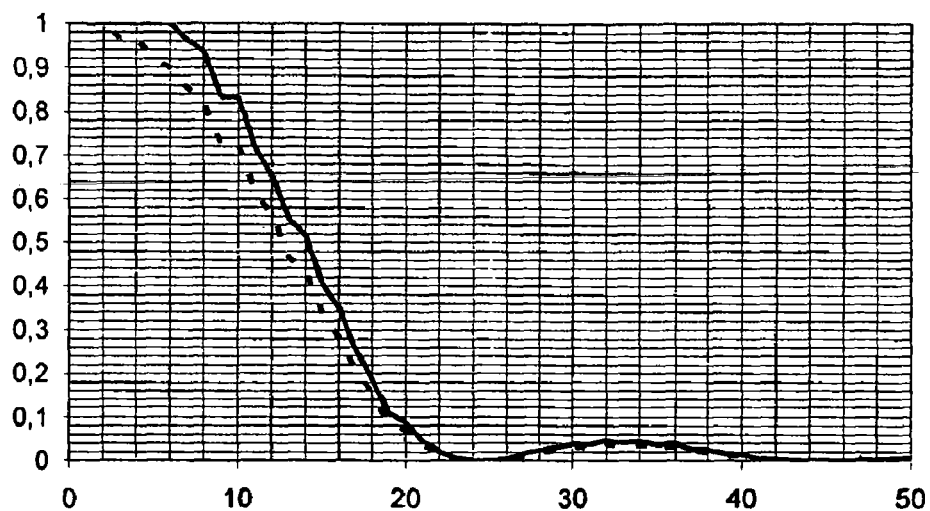
FIG. 4 a representation of total depth response functions in the approach of geometric optics for an illuminating pattern with varying intensity, according to a sine function, in one dimension; and a binary illuminating pattern with light and dark stripes, which repeat with the period of the sine function.

Comparing a standard confocal point scanner with the models of geometric optics results in a total depth response function of (cf. the dotted curve in FIG. 4):

$$T_{response}(z) = 1 - \frac{1}{(2\pi z^2)^2}$$

Figure 5:
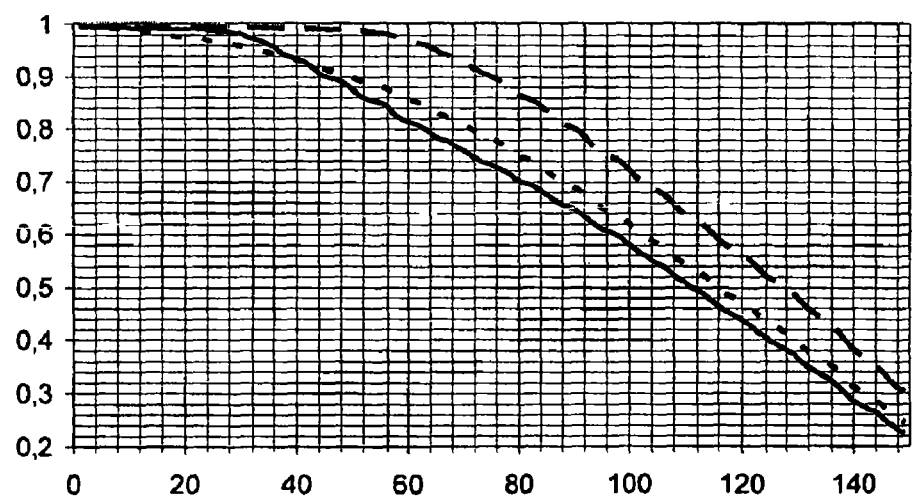
FIG. 5 a representation of total depth response functions in the Fresnel approach for the illuminating patterns in FIG. 4.

An exact wave optical description results in:

$$T_{response}(z) = \text{sinc}^2(az),$$

whereby a is a proportionality constant (cf. the dotted curve in FIG. 5).

Hereby, the total depth response function also drops in immediate proximity to the focal point.

Contrarily, the method, according to the invention, results in a total depth response function, which exhibits a plateau with the value 1 in immediate focal proximity, i.e., in immediate proximity of the object plane.

The basic principle for the change of the total depth response function can be plausibly explained as follows: If the sample is illuminated with rectangular stripe grids and the described method is used in order to process the four images, it is ensured that all object points are at least a quarter stripe removed from the edge between light and dark stripes. Based on the assumption that the transfer function PSF(z) corresponds with a circle with a radius, which depends on the defocussing z, it follows that the information about an adjacent edge of a stripe only reaches an object point when the defocussing becomes so great that the radius of the circle of confusion equals the distance to the edge of the stripe. Said distance varies for the object points, depending on their position, between a quarter and a half of the stripe width. Therefore, with the use of the simplified models of geometric optics, the plateau in the total depth response function has a value of 1 and a width z, depending on the position in the sample. The minimum width Z is calculated with:

$$\frac{\lambda rectangle}{8} = Z \cdot \frac{Rpupil}{f} \bigg| Z = \frac{\lambda rectangle?}{8 R_{pupil}}.$$

The maximum plateau width for the points in the center of the stripes is just about 2Z. If more than four images are used, the minimum plateau width (the continuous line in FIG. 5) can be further increased and reaches, theoretically, the maximum plateau width 2Z (long doted line in FIG. 5) for an infinite number of measurements.

This very simple explanation can wave-optically be recalculated with the Fresnel approach. The results to be expected can be differentiated into three different scenarios:

1. The illumination structures are significantly greater than the optical resolution of the system. In this case, geometric and wave-optical descriptions will provide the same results.

2. The illumination structures are not significantly greater than the resolution limit. In this case, a wave-optical calculation must be used for the total depth response function. Depending on the size of the structures, the plateau of the total depth response function is "rounded down." This decreases the effectively usable plateau width.

3. The size of the illumination structures is near the resolution limit. In this case, only the first frequency component of the illumination grid is still transferred from the optical system. In this case, no plateau will occur in the total depth response function. The total depth response function will, in this case, essentially correspond with the total depth response function in geometric approach for sinusoidal striped illumination.

The second scenario can be simulated wave-optically with the models of the paraxial Fresnel approach. The results are shown in FIG. 5.

Therein, the result for a sinusoidal illumination structure as a dotted line and the result for the aforementioned striped structure of equal period is shown. The transfer function PSF for this scenario was wave-optically calculated near the focal point and, in accordance with the equation for $I_{detector}$, folded with itself and with the binary striped pattern. FIG. 5 shows the resulting signal pattern. In this Figure, the total depth response functions for sinusoidal and binary illumination structures, represented by dotted and continuous lines, are shown in dependency of the location of the points on the optical axis or z axis, whereby the zero point corresponds with the focal plane. When compared to FIG. 4, it becomes apparent that the plateau of the total depth response function is distinctly rounded down.

In order to optimize the structured illumination in the form of an illumination grid for a certain measurement task, only the frequency of the illumination grid needs to be varied in an otherwise unchanged processing method. This variation causes two effects. First, the greater the grid period of the illumination grid, the worse the confocal suppression of light from non-focal planes. Thereby, the total depth response function essentially scales, and therefore, the amount of confocal suppression with the grid frequency does too. Second, the width of the plateau in the total depth response function, and, therefore, the depth area of the sample, which is mapped onto the detector with the intensity efficiency 1, also scale with the frequency of the illumination grid. However, this simple linear dependency of the confocal suppression/plateau width with the grid frequency of the illumination grid only applies to grid wavelengths, which are distinctly greater than the resolution limit of the optical system.

If this requirement is not met, the total depth response function must be wave-optically calculated separately for each grid frequency. Based on those data, the grid frequency can subsequently be optimized for different measuring tasks.

A second embodiment differs from the first embodiment simply in that the producing of the layer image is modified and, correspondingly, the evaluation installation is modified. Therefore, all explanations regarding the unmodified parts of the first embodiment also apply hereto, and the same reference symbols are used.

Now, through subtraction of the first image from the third image and the second image from the fourth image, two temporary images are created, for which an, at least, partial artificial light correction was effected as a result.

From the first temporary image and the second temporary image, the respective partial segments, which correspond with partial areas 37 and 38, respectively, are assembled to a layer image.

A third and fourth embodiment differ from the first and second embodiment in such a way that from the images of the light and dark areas, the middle stripes with width ¾ p, and not the ones with width p/2, are used as partial areas 37 and 38, which are, correspondingly, partial segments, resulting in overlapping partial segments. Since the partial segments overlap, summation in the overlapping areas leads to intensity enhancements, which are eliminated through referencing or renormalization.

The other steps are the same as in the first and second embodiment.

In a fifth embodiment of the method and the device, according to the invention, not the field stop 15 but the object 4 is moved. Thereto, a stage can be used, on which the object is arranged, and which is movable in directions parallel to the object plane 3 by means of a drive, controlled by the evaluation installation 7. The images are processed analogously to the first embodiment. For the positioning of the object 4 in the object plane 3, piezoactors, eccentric drives or other suitable adjustment mechanisms can be used, but preferably a motorized microscope stage. The second through the fourth embodiments can be modified accordingly.

Figure 6:
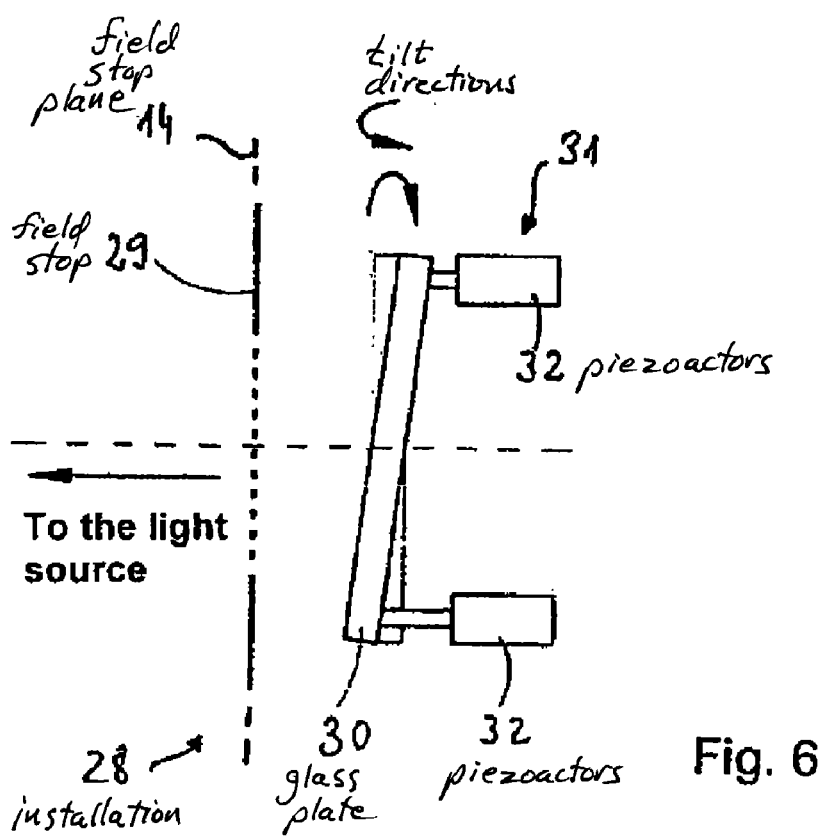
FIG. 6 a schematic partial representation of an installation for producing illuminating patterns with a device for the detection of an image of an object, according to a sixth preferred embodiment of the invention.

A device, according to a sixth preferred embodiment of the invention, differs from the device of the first embodiment in such a way that a modified installation 28, shown in principle in FIG. 6, for producing illuminating patterns and an accordingly modified evaluation installation are used. Since the other components are essentially unchanged, the same reference symbols are used, and the explanations for the first embodiment apply accordingly.

The installation 28, partially shown in FIG. 6, possesses as an element, which acts as a structured aperture, a field stop 29, arranged in the field stop plane 14, with a chessboard structure, which exhibits transparent and opaque square areas (cf. FIG. 7), which are developed in two orthogonal directions to each other with equal periods. In order to produce different illumination structures, installation 28, as shown schematically in FIG. 6, possesses a plane-parallel glass plate 30, which is subordinated to the structured field stop 29 in the direction of light, and which can be tilted around two axis orthogonal to each other. For controlled, defined tilting of said glass plate 30, piezoactors 32 are preferably provided as a drive, which can be appropriately activated with a control device from the evaluation installation not shown in said Fig. As is well known, tilting of the glass plate 30 leads to an optical beam displacement of the optical path and, therefore, to an offset mapping of field stop 29 onto the object 4. The arrows shown in FIG. 6 indicate the tilt directions of the glass plate 30.

Other suitable elements can also be used for producing beam displacement. In another embodiment, eccentric drives or other suitable drive mechanisms can also be used as drives for glass plate 30.

Figure 7:
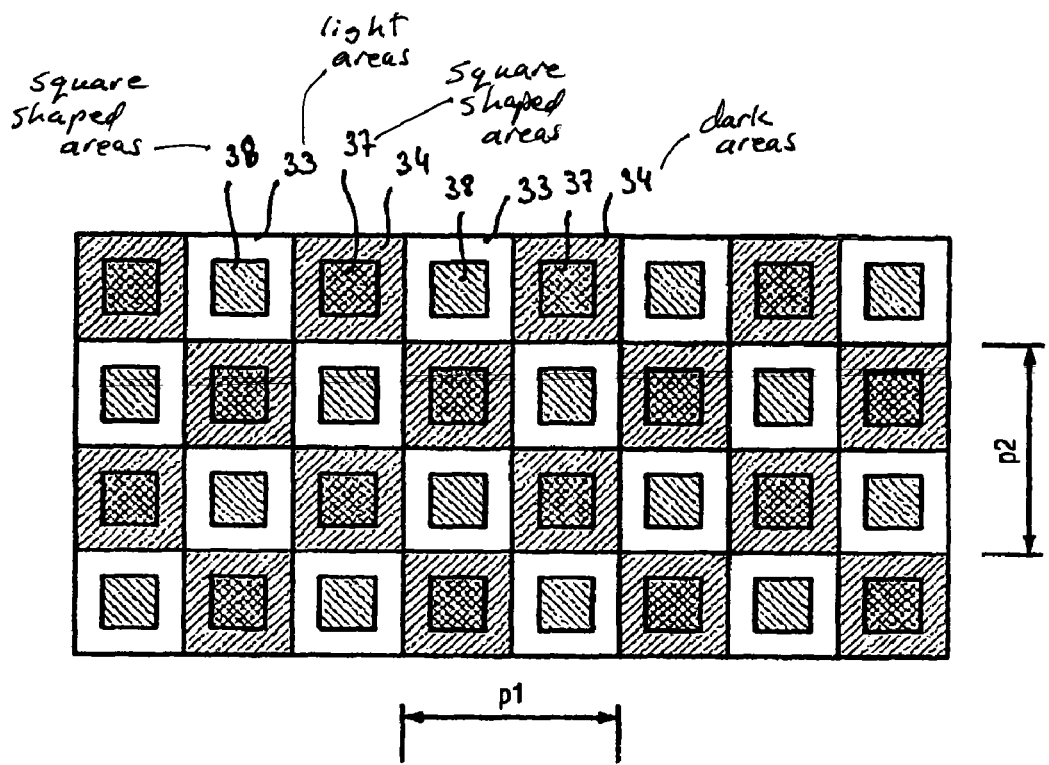
FIG. 7 a chessboard illuminating pattern, periodic in two directions, in the device and/or a method, according to a sixth preferred embodiment of the invention.

Mapping field stop 29 in the object plane 3 results, as shown in FIG. 7, in a basic pattern with square light areas 33 and dark areas 34, which are periodically arranged in two orthogonal directions to each other, and which form a chessboard pattern.

In the first direction, hereinafter identified with the digit 1, the basic pattern exhibits a period p1, and in the second direction, hereinafter identified with the digit 2, the period p2, whereby in this embodiment, periods with equal size are chosen.

In order to produce the 16 illuminating patterns in this example, the basic pattern, which in itself represents a first illuminating pattern, is, at first, shifted three times in succession by the distance v1 in the direction 1, i.e., parallel to the horizontal sides of the light areas 33 in FIG. 7, whereby a second, third, and fourth illuminating pattern is produced. For producing a fifth illuminating pattern, a shift is executed by the distance v2 in a direction, which is orthogonal to the direction of the first shift, i.e., parallel to the vertical side of the light areas in FIG. 7. Consequently, three additional illuminating patterns are produced through a shift of one distance v1 each in the direction of the first shifts. Subsequently, additional shifts by the direction v2 are made, followed by three shifts by v1, once again by v2, and three more by v1.

The periods p1 and p2 in the object plane are, preferably, in the area between 1 μm and 100 μm. In other embodiments, they can be chosen with varying sizes.

Through overlapping of the 16 illuminating patterns, their light areas 33 entirely cover the object 4 in the object plane 3. Correspondingly, the same applies for the dark areas 34.

The method for mapping the object 4, according to the sixth preferred embodiment of the invention, is analogous to the first embodiment.

Now the partial segments each correspond with square-shaped areas 37 and 38 in a square of the chessboard pattern, the edge of which exhibits a distance of a quarter of the length of the side of the light or dark area from the respective edge of the light or dark area.

Compared to the method of the first embodiment, i.e., the use of illuminating patterns with stripes, this method has the advantage that the modulation through the structured illumination disappears faster outside the focal plane or object plane, thereby better suppressing light outside of the depth of field of the imaging optical element.

Figure 8:
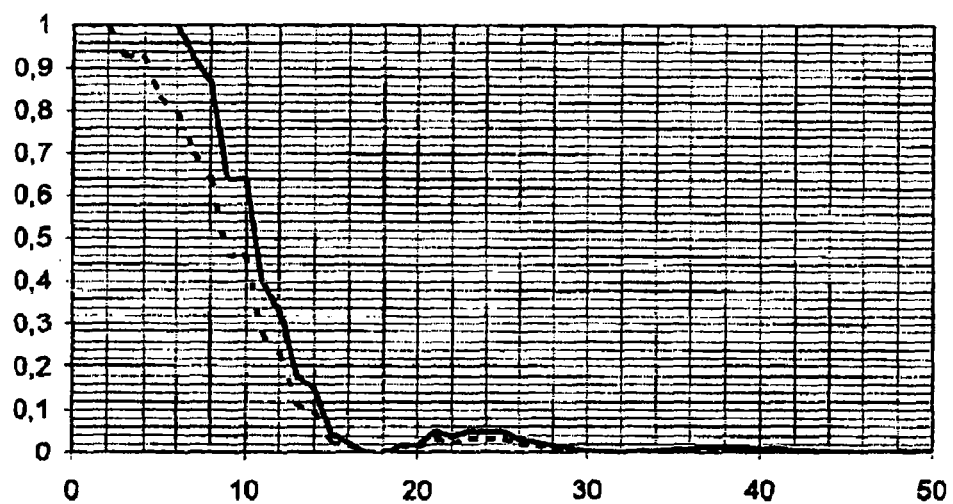
FIG. 8 a representation of total depth response functions in the approach of geometric optics for an illuminating pattern with varying intensity, according to a sine function, in two dimensions; and a binary illuminating pattern with square-shaped light and dark stripes, which repeat with the period of the sine function and are arranged in a chessboard pattern.

FIG. 8 shows, as an example, the total depth response functions in the approach of geometric optics for the binary illuminating pattern with chessboard pattern-shaped intensity distribution (continuous line), and for an illuminating pattern with intensity distribution, which is sinusoidal in two dimensions (dotted line). As in FIG. 4 and FIG. 5, the abscissa describes the distance from the focal plane in scaled random units, and the ordinate describes the respective value of the total depth response functions, also in randomly scaled units. Consequently, a better approach to a box-shaped profile is achieved.

A device for producing an image of an object, according to a seventh preferred embodiment of the invention, differs from the device of the first embodiment due to a different drive for the field stop 15. Since all other components are unchanged, the same reference symbols are used, and the explanations in connection with the first embodiment, according to FIG. 1, apply accordingly.

Figure 9:
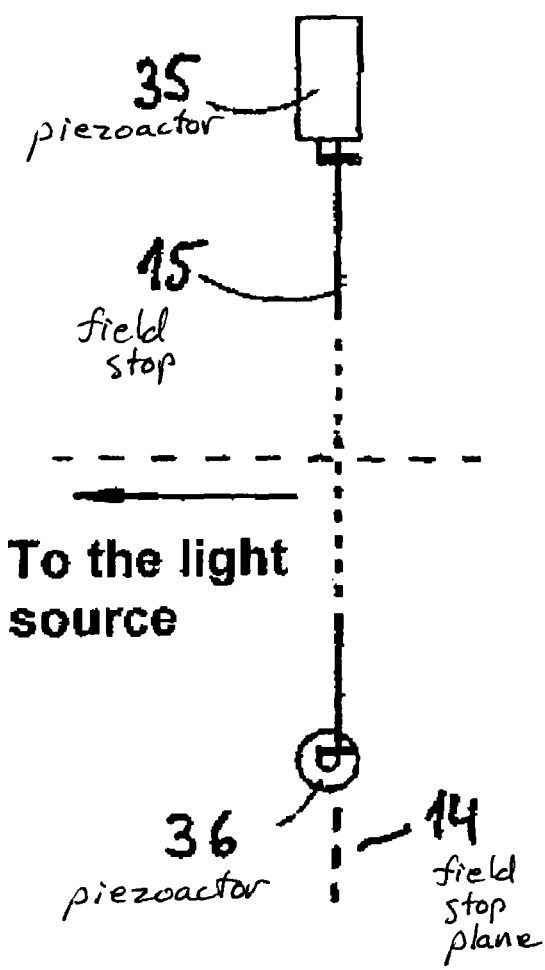
FIG. 9 a schematic partial representation of an installation for producing illuminating patterns with a device for the detection of an image of an object, according to a seventh preferred embodiment of the invention.

FIG. 9 shows a schematic partial representation of the modified installation for producing illuminating patterns. The drive controlled by the control mechanism of the evaluation installation includes piezoactors 35 and 36, which are coupled with the field stop 15; therefore, the field stop 15 can be adjusted definably by means of the piezoactors 35 and 36 through a lateral shift along two directions, which are orthogonal to each other, within the field stop plane 14. Through mapping of the field stop 15, which is set in different positions, onto the object 4, different illumination structures, as before, are produced in the object plane 3, which, subsequently are mapped together with object 3 onto the detector 6.

Figure 10:
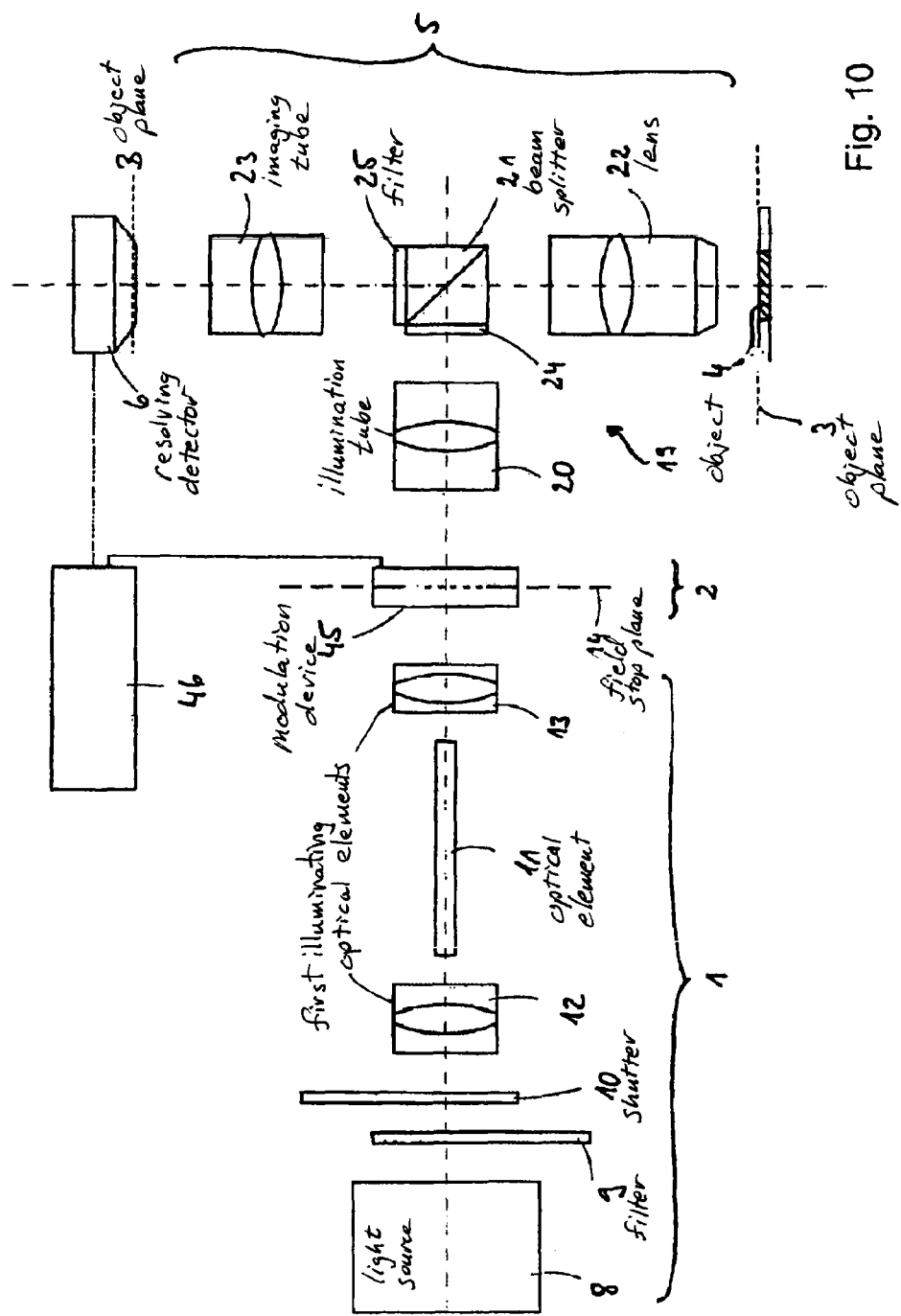
FIG. 10 a schematic representation of the optical structure of a device for the detection of an image of an object, according to an eighth preferred embodiment of the invention.

An eighth preferred embodiment of the invention differs from the previously described embodiments in such a way that the installation for producing illuminating patterns possesses neither a field stop nor a drive but, instead, as an element, acting as structured aperture, an electrically controllable modulation device 45 in the form of a transmitted light LCD, which is arranged in the field stop plane 14. As shown schematically in FIG. 10, the modulation device 45 is connected via a control line to the evaluation installation, which, compared to the evaluation installation 7 of the first embodiment, is modified in such a way that the light/dark patterns, which are stored in the evaluation installation, are shown on the transmitted light LCD, causing respective illuminating patterns to be beamed onto the object plane 3.

Figure 11:
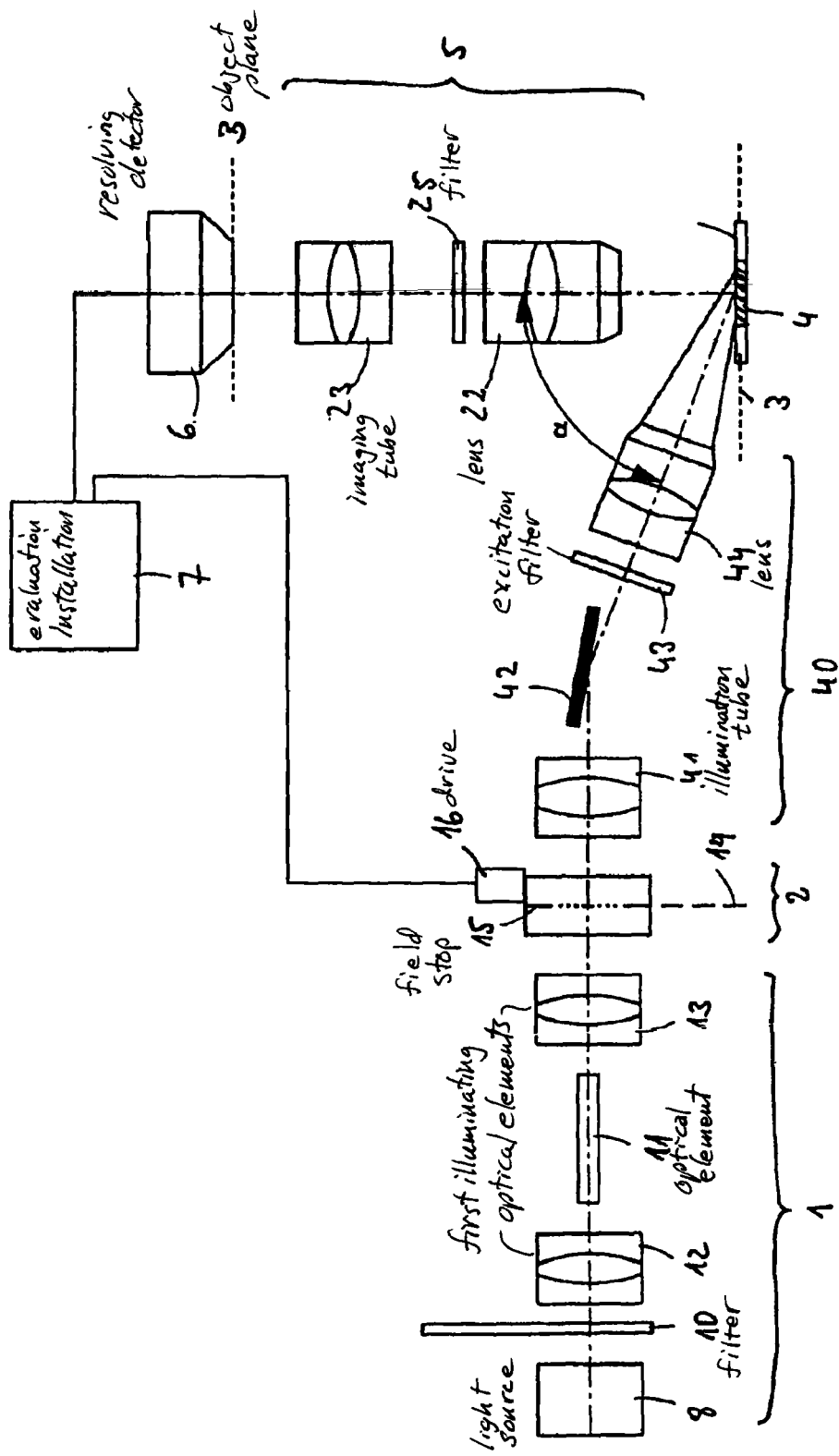
FIG. 11 a schematic representation of the optical structure of a device for the detection of an image of an object, according to a ninth preferred embodiment of the invention.

A device, according to a ninth preferred embodiment of the invention, the optical overall design of which is shown in a simplified representation in FIG. 11, differs from the device of the first embodiment in such a way that the element, acting as aperture, can be mapped sharply onto the object for the purpose of dark field illumination. Thereto, the second illuminating optical element 19 is replaced with the modified illuminating optical element 40, and the beam splitter 21 is no longer necessary. For components, which, in comparison to the first embodiment, are essentially unchanged, the explanations of the first embodiment apply accordingly, and the same reference symbols are used.

The device includes the illumination installation 1 with the light or radiation source 8 and, optionally, the subsequently arranged shutter 10 and, advantageously, optical elements 11, e.g., a light transmission bar or a hollow rod with internal reflection, which homogenize the optical path, as well as illuminating optical elements 12 and 13 for homogenous illumination of an installation 2, arranged within the optical path of the field stop plane 14, for producing illuminating patterns, and which includes the structured field stop 15. Said field stop 15 is arranged definably positionable in the optical path of the field stop plane 14 in two directions, which are orthogonal to each other. Therefore, it can be shifted in this plane 14 by means of the drive 16, which is coupled with the field stop 15.

By means of the modified second illuminating optical element 40, which is arranged subsequent to the field stop 15, and which, in this example, consist of an illumination tube 41, a deflection mirror 42, an excitation filter 43, and a lens 44, the element acting as structured aperture, i.e., in this case the structured field stop 15, is mapped with dark field illumination onto the object 4, which is to be examined or measured, or object plane 3.

The second illuminating optical element 40 forms a so-called Scheimpflug optical element, the optical axis of which is arranged at an angle α to the optical axis of the imaging optical element 5, which runs vertically to the surface of the object 4 or the object plane 3. Preferably, the angle α is >50°. Through this imaging optical element 5, which, for example, includes the lens 22, the filter 25 as well as the imaging tube 23, the object 4 is mapped with high contrast and together with its superimposed illumination structure onto the resolving detector 6 for optical radiation.

However, even in a modified embodiment, the imaging optical element can, analogously, be designed as a Scheimpflug optical element. In this case, the optical axis of the second illuminating optical element 40 is positioned vertically on the surface of the object 4 or the object plane 3. Together with this optical axis, the optical axis of the imaging optical element consequently forms the angle α.

The invention claimed is:

1. A method for producing an image of a layer of an object by imaging through a wide field optical element onto a resolving detector, comprising:

illuminating the object in a focused manner on at least one object plane using at least two binary illuminating patterns wherein the illuminating patterns respectively comprise dark areas and light areas and the light areas or the dark areas or both the light areas and dark areas completely cover the object when the illuminating patterns are superimposed;

detecting corresponding images for each illuminating pattern; and determining a layer image from the detected images, said layer image comprising partial segments that respectively reproduce a partial area of the object, the partial area having partial area edges and the partial area being arranged inside the light area of at least one of the used illuminating patterns, such that said partial area edges are arranged at a distance from edges of the light area about at least one predefined minimum distance, and respectively determining the partial segments with at least partial artificial light correction using at least two images which are respectively detected for different illumination patterns in which the partial area corresponding to the respective partial segment is arranged completely inside the light area of a first different illuminating pattern or completely inside a dark area of a second of the different illuminating patterns.

2. The method according to claim 1, further comprising determining the partial segments such that the partial segments join without a gap or overlap.

3. The method according to claim 2, further comprising determining the partial segments such that the partial segments overlap less than 10% of a minimum extent.

4. The method according to claim 3, wherein a minimum distance is greater than ⅕ of the smallest distance of adjacent borders.

5. The method according to claim 3, further comprising initially forming a light or dark frame from the detected images for the determination of the layer image, using partial segments of the detected images, which reproduce respective areas of the object, and which reproduce an area of the object within the light or dark area of an illuminating pattern used for detection of a respective image, and the edges of which display the minimum distance from the transitions between the light and dark areas of the illuminating pattern; and calculating the difference between the light and dark frame, to form at least a partially corrected layer image.

6. The method according to claim 1, further comprising using an even number of illuminating patterns, and, first determining images with at least partial artificial light correction through formation of a difference image from detected images, wherein the respectively used illuminating patterns of said images are complementary to each other, and determining a layer image from the images with partial artificial light correction.

7. The method according to claim 1, further comprising determining the illuminating patterns based on a basic pattern, which is offset differently for each illuminating pattern and relative to the object.

8. The method according to claim 7, further comprising using a periodic basic pattern as the basic pattern, whereby the offset basic patterns are obtainable through a shift of the basic pattern relative to the object.

9. The method according to claim 8, further comprising choosing an amount of the shift or shifts and a number of shifts and resulting illuminating patterns in such a way that a depth response function displays a plateau in the area of the focal plane in which the illuminating patterns are focused.

10. The method according to claim 7, wherein the object is shifted relative to the basic pattern.

11. The method according to claim 7, further comprising shifting the basic pattern by use of a mechanical device.

12. The method according to claim 7, further comprising using a periodic striped pattern with period p as the basic pattern, wherein the periodically alternating light and dark stripes are of equal width, and from which the other illuminating patterns are obtainable through a shift by the m/n times the period p transversely to the longitudinal direction of the stripes, whereby 0<m<n.

13. The method according to claim 7, further comprising using illuminating patterns with one periodic arrangement each of light and dark areas in two directions, wherein the arrangements are offset against each other in at least one of the directions.

14. The method according to claim 1, further comprising controlling an electrically controllable modulation device for light in such a way that the illuminating patterns are produced.

15. The method according to claim 1, further comprising filtering the light and/or dark frames with low frequency.

16. A device for producing an image of a layer of an object, comprising an illumination installation for focused illumination of the object in an object plane;

a device that produces at least two predefined illuminating patterns for illuminating the object on the object plane with an element, that acts as a structured aperture, arranged behind the illumination installation within the optical path, wherein the illuminating patterns respectively comprise dark areas and light areas, and the light and/or the dark areas completely cover the object when the illuminating patterns are superimposed;

an imaging optical element, that maps of the object plane onto an image plane;

a resolving detector, arranged on the image plane, that detects optical radiation from the object; and an evaluation installation that processes detection signals from the detector, which is constructed to determine a layer image from the detected images, which comprises partial segments that respectively reproduce a partial area of the object the partial area having partial area edges and the partial area being arranged inside the light area of one of the used illuminating patterns such that said partial area edges are arranged at a distance from the edges of the light area about at least one predefined minimum distance, and which are respectively determined with at least partial artificial light correction using at least two images which are respectively detected for different illuminating patterns in which the partial area corresponding to the respective partial segment is arranged completely inside the light area of a first different illuminating pattern or completely inside a dark area of a second of the different illuminating patterns.

17. The device according to claim 16, wherein the imaging optical element comprises a wide field optical element.

18. The device according to claim 16, wherein the device is designed such that the partial segments join without a gap or overlap.

19. The device according to claim 18, wherein the device designed in such a way that the partial segments overlap less than 10% of a minimum extent.

20. The device according to claim 16, wherein the device is designed such that minimum distances are greater than ⅕ of the smallest distance of the adjacent borders of a light or dark area.

21. The device according to claim 16, wherein the evaluation installation initially forms a light or dark frame from the detected images for the determination of the layer image, wherein partial segments of the detected images, which reproduce respective areas of the object are used, and which reproduce an area of the object within the light or dark area of an illuminating pattern used for detection of a respective image, and the edges of which display the predefined minimum distance from the transitions between the light and dark areas of the illuminating pattern; and wherein by calculating the difference between the light and dark areas, at least a partially corrected layer image is formed.

22. The device according to claim 16, wherein an even number of illuminating patterns is used, and in which the evaluation installation at first, determines images with at least partial artificial light correction through formation of a difference image from detected images, wherein the respectively used illuminating patterns of said images are complementary to each other, and determines a layer image from the images with at least partial artificial light correction.

23. The device according to claim 16, wherein the illuminating patterns are determined by a basic pattern, which is offset differently for each illuminating pattern and relative to the object.

24. The device according to claim 23, wherein the basic pattern is a periodic basic pattern and further wherein the offset basic patterns are obtainable through a shift of the basic pattern.

25. The device according to claim 24, wherein an amount of shift or shifts and a number of shifts and resulting illuminating patterns, are chosen such that a depth response function displays a plateau in the area of the focal plane in which the illuminating patterns are focused.

26. The device according to claim 16, further comprising a drive, that moves the object or a slide supporting the object and which is controllable by the evaluation installation such that a basic pattern maps an illuminating pattern on the object, which is moved together with the slide, and wherein the basic pattern is produced by an element acting as a structured aperture; and wherein the evaluation installation automatically detects images of the detector after every shift in the position of the object via the evaluation installation.

27. The device according to claim 16, further comprising a drive, that moves the object or a slide for the object and which is controllable by the evaluation installation such that a basic pattern maps an illuminating pattern on the object, which is moved together with the slide, and wherein the basic pattern is produced by an element acting as a structured aperture; and wherein the evaluation installation automatically detects images of the detector after every shift in the position of the object by means of the evaluation installation.

28. The device according to claim 16, wherein the element acting as a structured aperture comprises a field stop, and a movable light bending element for producing at least two illumination structures is arranged behind the field stop.

29. The device according to claim 28, wherein the field stop comprises a stripe-shaped structure of alternating transparent and opaque areas.

30. The device according to claim 28, wherein the field stop comprises a periodic arrangement of transparent and opaque areas in two directions, wherein the opaque areas are adjacent to each other.

31. The device according to claim 28, wherein the element acting as the structured aperture comprises an electronically controllable modulation device.

32. The device according to claim 31, wherein the element acting as the structured aperture, comprises an LCD or a DMD.

33. The device according to claim 16, wherein the illuminating optical element for mapping of the element which acts as the structured aperture onto the object comprises an illuminating optical element for dark field illumination.

34. The device according to claim 16, wherein the evaluation installation is designed such that light and/or dark frames are filtered with low frequency.

* * * * *

UNITED STATES PATENT AND TRADEMARK OFFICE
CERTIFICATE OF CORRECTION

PATENT NO. : 8,175,353 B2  Page 1 of 1
APPLICATION NO. : 12/307718
DATED : May 8, 2012
INVENTOR(S) : Peter Westphal et al.

It is certified that error appears in the above-identified patent and that said Letters Patent is hereby corrected as shown below:

On the Title page, under (30) Foreign Application Priority Data, delete "10 2006 031 177", and insert --10 2006 031 177.9--.

In the Specifications

Col. 4, lines 61-62, delete "(IF POSSIBLE PLEASE INDICATE QUANTITATIVE LIMIT).".

Col. 9, line 40, delete "min", insert --m/n--.

Col. 11, lines 56, delete "in", insert --it--.

Col. 15, line 49, delete "doted", insert --dotted--.

Signed and Sealed this
Fifteenth Day of April, 2014

Michelle K. Lee
*Deputy Director of the United States Patent and Trademark Office*